(12) United States Patent
Moriniere et al.

(10) Patent No.: US 12,491,722 B2
(45) Date of Patent: Dec. 9, 2025

(54) INKJET PRINTING DEVICE, COMPRISING AT LEAST TWO SERVOCONTROL LOOPS, SUITABLE FOR LARGE COMPLEX SURFACES

(71) Applicants: Airbus Operations SAS, Toulouse (FR); Airbus SAS, Blagnac (FR); Airbus Operations GmbH, Hamburg (DE)

(72) Inventors: Boris Moriniere, Toulouse (FR); Olivier Burgy, Toulouse (FR); Samuel Leleu, Toulouse (FR); Fabian Mahler, Taufkirchen (DE)

(73) Assignees: Airbus Operations SAS, Toulouse (FR); Airbus SAS, Blagnac (FR); Airbus Operations GmbH, Hamburg (DE)

( * ) Notice: Subject to any disclaimer, the term of this patent is extended or adjusted under 35 U.S.C. 154(b) by 137 days.

(21) Appl. No.: 18/501,299

(22) Filed: Nov. 3, 2023

(65) Prior Publication Data

US 2024/0208243 A1  Jun. 27, 2024

(30) Foreign Application Priority Data

Dec. 26, 2022  (FR) ...................................... 2214499

(51) Int. Cl.
*B41J 3/407*  (2006.01)
*B25J 9/12*  (2006.01)
(Continued)

(52) U.S. Cl.
CPC ............... *B41J 3/4073* (2013.01); *B25J 9/12* (2013.01); *B25J 9/1628* (2013.01); *B25J 19/02* (2013.01);
(Continued)

(58) Field of Classification Search
CPC ........ B41J 3/4071; B41J 25/304; B25J 9/123; B25J 9/126; B25J 9/12; B25J 9/1628;
(Continued)

(56) References Cited

U.S. PATENT DOCUMENTS 9,527,275 B1  12/2016  Flannigan et al.
2016/0355026 A1  12/2016  Mathis et al.
(Continued)

OTHER PUBLICATIONS

French Search Report for corresponding French Patent Application No. 2214499 dated Jun. 12, 2023; priority document.

*Primary Examiner* — Leslie J Evanisko
*Assistant Examiner* — Thomas Ray Knief
(74) *Attorney, Agent, or Firm* — Greer, Burns & Crain, Ltd.

(57) ABSTRACT

A inkjet printing device including an articulated robot having a free end, a printing module including a first part linked to the free end of the articulated robot and a second part that is movable with respect to the first part and supporting at least one printhead, a first servocontrol loop configured to control the articulated robot, a second servocontrol loop configured to correct, if necessary, the position of the second part with respect to the first part, which has a correction frequency at least five times greater than that of the first servocontrol loop. This solution makes it possible to obtain an inkjet printing device suitable for complex surfaces of large dimensions, that is highly responsive and offers high print quality.

14 Claims, 4 Drawing Sheets

(51) Int. Cl.
*B25J 9/16* (2006.01)
*B25J 19/02* (2006.01)
*B41J 2/01* (2006.01)
B05B 13/04 (2006.01)
B25J 11/00 (2006.01)

(52) U.S. Cl.
CPC ............. *B41J 2/01* (2013.01); *B05B 13/0431* (2013.01); *B05B 13/0452* (2013.01); *B25J 11/0075* (2013.01)

(58) Field of Classification Search
CPC ...... B25J 9/1684; B25J 11/0075; B25J 19/02; B25J 19/021
USPC .......................................................... 347/19
See application file for complete search history.

(56) References Cited

U.S. PATENT DOCUMENTS

2018/0056670 A1\* 3/2018 Kerr ...................... B05B 13/005
2020/0198367 A1 6/2020 Zhang et al.

\* cited by examiner

INKJET PRINTING DEVICE, COMPRISING AT LEAST TWO SERVOCONTROL LOOPS, SUITABLE FOR LARGE COMPLEX SURFACES

CROSS-REFERENCES TO RELATED APPLICATIONS

This application claims the benefit of the French patent application No. 2214499 filed on Dec. 26, 2022, the entire disclosures of which are incorporated herein by way of reference.

FIELD OF THE INVENTION

The present application relates to an inkjet printing device, comprising at least two servocontrol loops, suitable for large complex surfaces. This device is more particularly suitable for decorating the outer surfaces of an aircraft.

For the present application, an outer surface of an aircraft corresponds to the outer surface of the fuselage, of the wing unit and/or of the tail unit of the aircraft.

BACKGROUND OF THE INVENTION

According to one known technique, an outer surface of an aircraft is covered with a coating applied by spraying, for example using paint guns which generate a paint mist (overspray). When the coating comprises markings and/or decorative patterns, masking elements must be used to cover the zones not being painted in order to produce clean outlines. This step of putting masking elements in place is lengthy and tedious. This step is all the longer and more tedious when it has to be repeated several times if the markings and/or the decorative patterns comprise several colors.

An inkjet printing device makes it possible to deposit, on demand, drops of a fluid, dot by dot, on a surface. According to an embodiment that can be seen in FIG. 1, such a printing device 10 comprises a printing system 12 comprising a print control 14 and at least one printhead 16, a displacement system 18 comprising a displacement control 20 and a cartesian robot 22 as well as a control unit 24 configured to drive the printing and displacement systems 12, 18.

Figure 1:
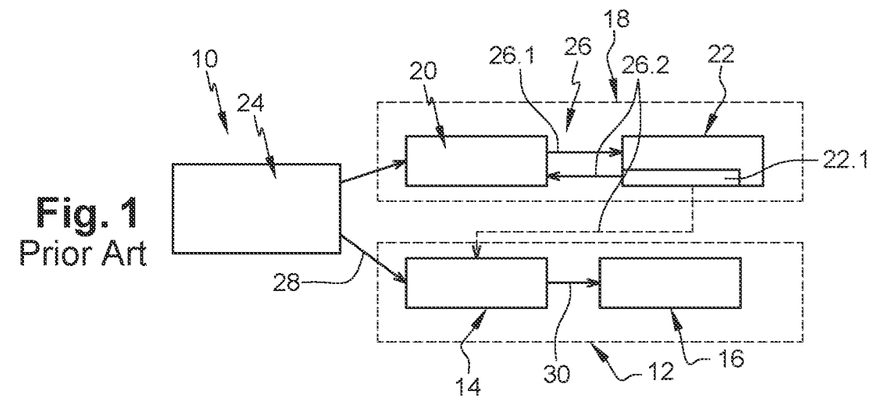
FIG. 1 is a schematic representation of a printing device illustrating a first embodiment of the prior art.

The cartesian robot 22 is configured to displace the printhead 16 in three orthogonal directions. It comprises several actuators and, for each actuator, an encoder 22.1 configured to determine the real movement of the associated actuator.

The displacement system 18 is configured to displace the printhead 16 along rectilinear and mutually parallel trajectories. The displacement system 18 comprises a servocontrol loop 26 between the actuators of the cartesian robot 22 and the displacement control 20. Thus, the displacement control 20 transmits to the actuators of the cartesian robot 22 displacement setpoints 26.1 as a function of the theoretical movements to be performed. In return, each encoder 22.1 transmits to the print and displacement controls 14, 20 displacement data 26.2 as a function of the real movements performed by the actuators of the cartesian robot 22. The displacement control 20 is configured to correct the displacement setpoints 26.1 transmitted to the actuators of the cartesian robot 22 as a function of the displacement data 26.2 received in order for the real movements performed by the actuators of the cartesian robot 22 to be as close as possible to the theoretical movements.

In addition, the control unit 24 transmits to the print control 14 image data 28 relating to the image to be printed. Based on the image data 28 and displacement data 26.2 received, the print control 14 transmits to the printhead 16 instructions 30 to deposit drops of ink by the printhead 16 at given instants as a function of the position of the printhead 16.

Such a printing device comprising a cartesian robot makes it possible to obtain a high print accuracy. However, its use is limited to flat surfaces of small dimensions. It is not suited to a surface of large complex dimensions like the outer surface of an aircraft. For the present application, a complex surface is understood to mean a non-planar surface having at least one radius of curvature.

Figure 2:
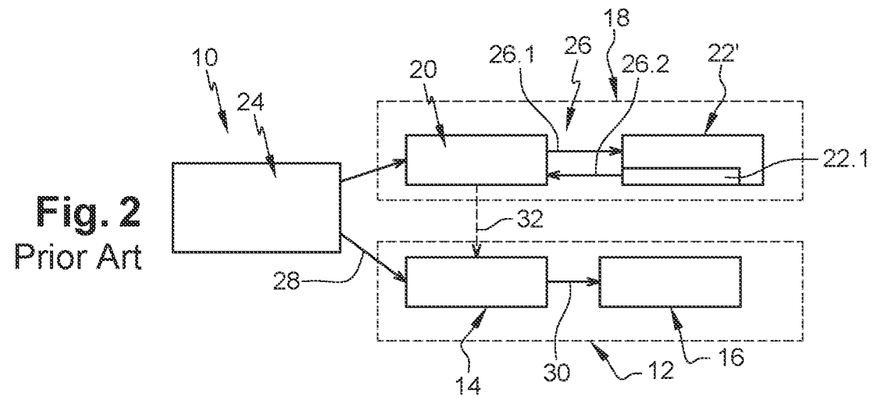
FIG. 2 is a schematic representation of a printing device illustrating a second embodiment of the prior art.

To be able to displace the printhead 16 above a complex surface of large dimensions as illustrated in FIG. 2, the displacement system 18 comprises, instead of the cartesian robot 22, an articulated robot 22' which has a fixed frame and an end that is movable with respect to the frame according to six axes of rotation and supporting at least one printhead 16. In the case of an articulated robot 22', the displacement data 26.2 of the encoders 22.1 are not directly transmitted to the print control 14. The displacement control 20 is configured to determine, from the displacement data 26.2 of each encoder 22.1, the trajectory of the end of the articulated robot 22' and transmit to the print control 14 trajectory data 32 as a function of the determined trajectory of the end of the articulated robot 22'. Based on the image and trajectory data 28, 32 received, the print control 14 transmits to the printhead 16 instructions 30 to deposit drops of ink by the printhead 16 at given instants as a function of the position of the printhead 16.

The trajectory of the end of an articulated robot 22' has a precision of the order of +/−0.5 mm, which is not sufficient to decorate an outer surface of an aircraft, which requires a much higher precision, of the order of a hundredth of a millimeter.

The document U.S. Pat. No. 9,527,275 proposes a solution aiming to improve the precision of the print. According to an embodiment described in this document and illustrated in FIG. 3, a printing device 10' comprises:
- a printing system 12 comprising a print control 14 and first and second printheads 16, 16',
- a displacement system 18 comprising a displacement control 20 and an articulated robot 22',
- an image sensor 38,
- a control unit 24 configured to drive the print and displacement systems 12, 18 as a function of the images acquired by the image sensor 38.

Figure 3:
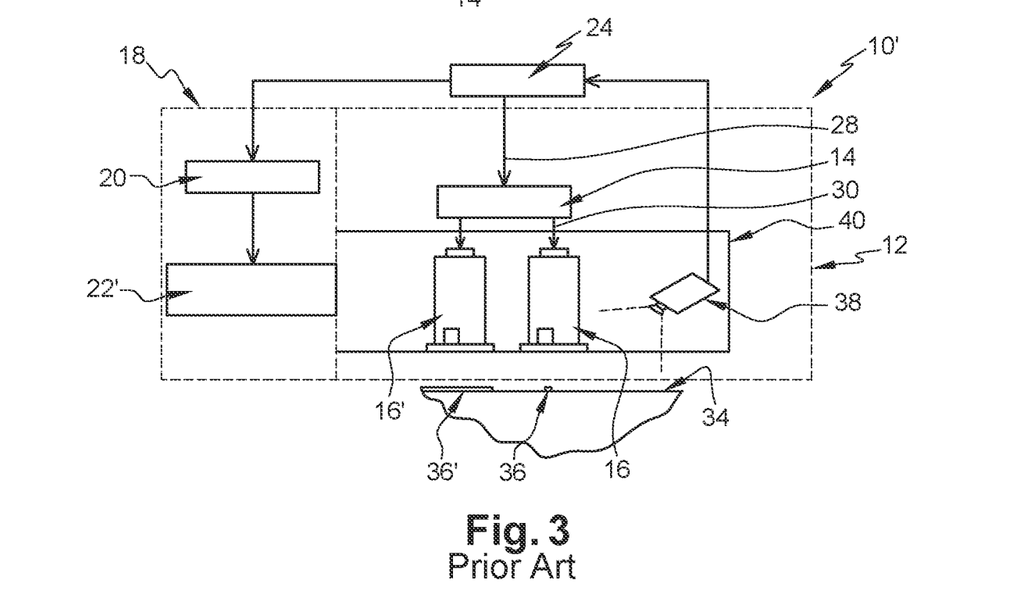
FIG. 3 is a schematic representation of a printing device illustrating a third embodiment of the prior art.

The first printhead 16 is configured to deposit on the surface 34 to be printed marks 36 according to a first trajectory. In parallel, the second printhead 16' is configured to deposit on the surface 34 a coating band 36' corresponding to a band of the image to be reproduced by following a second trajectory. The image sensor 38 is configured to capture images of the surface 34, notably of a zone of the surface 34 to which the marks 36 are applied. According to another configuration, the first and second printheads are configured to print coating bands corresponding to bands of the image.

According to this embodiment, the first and second printheads 16, 16' and the image sensor 38 are secured to a plate 40 fixed to the end of the articulated robot 22' and immobile with respect to this plate 40. Thus, the first and second trajectories are perfectly parallel. In operation, the marks 36 and the coating band 36' are simultaneously applied to the surface 34 by following the first and second parallel trajectories. When printing a new coating band 36', the image sensor 38 captures images comprising the marks 36 simultaneously applied to the coating band previously deposited. From these images, the control unit 24 is configured to determine, precisely, the first trajectory followed by the first printhead 16 during the preceding pass and transmit trajectory data to the displacement unit 20 so that the end of the cartesian robot follows a parallel trajectory. Thus, the trajectory of the second printhead 16' in a given pass is parallel to the trajectory of the first printhead 16' in the pass preceding the given pass.

Even though the embodiment described in the document U.S. Pat. No. 9,527,275 makes it possible to improve the precision of the print, it does not make it possible to achieve a level of precision that is sufficient for the quality required in terms of coating of an outer surface of an aircraft, all the more so when the surface to be covered is not perfectly immobile in the case of an outer surface of an aircraft and can oscillate slightly.

The document US2020/0198367 proposes a printing device suitable for painting an aircraft fuselage. This device comprises a movable platform, an articulated arm supported by the movable platform, a first support linked to the end of the articulated arm, a second support linked to the first support by at least one actuator and a printing module secured to this second support. In addition, the printing device comprises a trajectory following system configured to determine the real position of the movable platform and of the articulated arm and local sensors, secured to the printing module, configured to determine the position of the printing module with respect to the surface to be printed.

The data determined by the trajectory system and by the local sensors are merged so as to determine a first set of corrective values to drive the position of the printing module in real-time, notably its transverse position (at right angles to the trajectory), and a second set of corrective values for driving the moment of ejection of the droplets of ink by the printing module.

The embodiment described in the document US2020/0198367 does not make it possible to obtain satisfactory precision.

The document US2016/0355026 describes a printing device suitable for painting the fuselage of an aircraft. This device comprises an articulated arm, a first support linked to the end of the articulated arm, a second support linked to the first support by several actuators and a printing module secured to the second support. In addition, the printing device comprises sensors configured to determine the real position of the printing module and a controller configured to drive the articulated arm and the set of actuators so as to correct, if necessary, the position of the printing module by comparing the real position determined by the sensors and the corresponding position of a predefined trajectory.

As previously, the embodiment described in the document US2016/0355026 does not make it possible to obtain satisfactory precision.

The present invention aims to remedy all or part of the drawbacks of the prior art.

SUMMARY OF THE INVENTION

To this end, a subject of the invention is an inkjet printing device that makes it possible to apply a coating to a surface by being displaced parallel to a direction of displacement, the surface comprising a normal direction that is substantially at right angles to the surface at a given point of the surface, the inkjet printing device comprising:

- an articulated robot which has a free end,
- a printing module which comprises:
  - a first part linked to the free end of the articulated robot,
  - a second part, movable with respect to the first part, supporting at least one inkjet printhead and occupying a given position at a given instant with respect to the first part,
  - at least one actuator configured to displace the second part with respect to the first part,
  - a first servocontrol loop configured to control the articulated robot and correct, if necessary, with a first given correction frequency, the position of the printing module,
  - a second servocontrol loop configured to control the actuator and correct, if necessary, the position of the second part of the printing module with respect to the first part.

According to the invention, the second servocontrol loop has a second correction frequency at least five times greater than the first correction frequency.

The provision of a second servocontrol loop nested in the first servocontrol loop which has a correction frequency at least five times greater than that of the first servocontrol loop makes it possible to obtain the printing precision required with a market-standard robotized arm and a first servocontrol loop of the robotized arm that is known.

According to another feature, each actuator configured to displace the second part with respect to the first part has a position-changing frequency greater than 10 Hz and at least five times greater than that of the robotized arm.

According to another feature, the printing module comprises at least one articulation, linking the first and second parts of the printing module, configured to allow the second part to be displaced with respect to the first part according to at least one movement out of a translational movement parallel to a transverse direction at right angles to the direction of displacement and to the normal direction, a rotational movement about an axis of rotation parallel to the normal direction and a translational movement parallel to the normal direction. In addition, the printing module comprises two actuators linking the first and second parts, offset with respect to one another in the direction of displacement, each of the two actuators being deformed in the transverse direction and being configured to displace the second part with respect to the first part in the transverse direction.

According to another feature, each actuator is chosen from among a piezoelectric actuator and an electromagnetic actuator.

According to another feature, the second servocontrol loop comprises at least one sensor configured to capture data relating to the surface to which the coating is applied and a processing unit configured to compare, from the data transmitted by the at least one sensor, the real position at a given instant of the second part of the printing module and a position desired at this given instant, in order to determine if there is a deviation and, if there is a deviation greater than a given threshold, drive the at least one actuator between the first part and the second part in order to modify the position of the second part with respect to the first part.

According to another feature, the second servocontrol loop comprises a first sensor positioned in front of the at least one printhead and a second sensor positioned behind the at least one printhead.

According to another feature, the first and second sensors are offset with respect to one another in a transverse direction at right angles to the direction of displacement and to the normal direction.

According to another feature, the processing unit is configured to determine, if a deviation greater than a given threshold is observed, at least one correction out of a translational movement parallel to the transverse direction and a rotational movement about an axis of rotation parallel to the normal direction.

According to another feature, each sensor is a "contact" image sensor positioned so as to view the surface.

According to another feature, the second servocontrol loop is configured to correct a positioning of the second part with respect to the first part with a latency less than 100 ms.

According to another feature, the second servocontrol loop comprises at least one distance sensor measuring a distance between the second part of the printing module and the surface in order to drive the at least one actuator between the first part and the second part of the printing module so as to keep this distance close to a predefined distance.

Also a subject of the invention is a method for producing a coating on a surface by applying in turns several coating bands that are mutually parallel and juxtaposed to one another by using an inkjet printing device according to one of the preceding features, each coating band comprising a first edge and a second edge that are substantially parallel to one another and register marks for guiding the inkjet printing device which are positioned along the first edge, the second edges of each coating band comprising extensions configured to mask the register marks of the adjacent coating band previously applied.

According to another feature, each register mark comprises printed zones and non-printed zones. In addition, each extension comprises printed zones in line with non-printed zones of the register mark to be masked and non-printed zones in line with printed zones of the register mark to be masked.

According to another feature, each extension is configured to totally cover a register mark.

BRIEF DESCRIPTION OF THE DRAWINGS

Other features and advantages will emerge from the following description of the invention, a description given purely by way of example, in light of the attached drawings, in which.

DETAILED DESCRIPTION OF THE PREFERRED EMBODIMENTS

According to one embodiment, a printing device 50 comprises a printing system 52 comprising a print control 54 and at least one printhead 56, a displacement system 58 comprising a displacement control 60 and an articulated robot 62 as well as a control unit 64 configured to drive the printing and displacement systems 52, 58. An articulated robot is also understood to be a polyarticulated robot.

The control unit 64 and the displacement system 58 can form a single element or two distinct elements.

The printing device 50 is configured to cover, at least partly, a surface S of a coating Rev comprising at least one layer. The coating Rev comprises, at each layer, a multitude of mutually juxtaposed dots which can be of the same color or of different colors. The surface S can be a complex surface and reach several tens of meters. According to one application, the surface S is an outer surface of an aircraft.

Whatever the application, the surface S has a given geometry and, at a given point, a normal direction Z at right angles to the surface S and directions X and Y at right angles to the first direction Z and at right angles to one another.

The printhead 56 is configured to apply, dot by dot, the coating Rev to the surface S. According to one configuration, the printing device is an inkjet printing device and each printhead 56 is an inkjet printhead.

The print control 54 is configured to transmit to each printhead 56 at least one instruction 66 to deposit at least one dot of the coating (a drop of ink in the case of an inkjet printhead 56) at a given instant.

According to one configuration, the articulated robot 62 has a fixed frame with respect to a given reference frame R, a free end configured to removably support at least one printing module 68 and various segments, linked to one another by articulations, linking the fixed frame and the free end. According to one arrangement, the articulated robot 62 comprises six articulations each comprising an axis of rotation. Obviously, the invention is not limited to this configuration for the articulated robot 62. Whatever the embodiment, the articulated robot 62 is configured as a function of the dimensions of the surface S to which the coating Rev is applied and so as to follow the geometry of the surface S. Thus, the robotized arm 62 has an amplitude of displacement that is sufficient to cover a large surface S. On the other hand, it has a displacement accuracy and a position-changing frequency (frequency at which the position of the free end of the robotized arm 62 can be changed) that are insufficient for the precision sought in print terms.

The control unit 64 is configured to transmit at least one displacement setpoint 70 to the displacement system 58 and more particularly to its displacement control 60 in order for the articulated robot 62 to displace the printing module 68 above the surface S along a desired trajectory.

The displacement system 58, the displacement control 60 and the articulated robot 62 are not described more because they can be identical to those of the prior art.

In operation, the printing device 50 applies the coating Rev by being displaced in a direction of displacement corresponding to the direction X, the direction Y corresponding to a transverse direction. Thus, each layer of the coating Rev is composed of several coating bands 74, 74', parallel to one another and juxtaposed to one another, applied in turns using the inkjet printing device 50. Each coating band 74 has a width (dimension taken in the transverse direction Y) which is a function of the printhead 56.

According to one embodiment, the printing device 50 comprises a first servocontrol loop 76 comprising at least one image sensor 78, secured to the printing module 68, configured to capture images of the surface S and transmit them to the control unit 64, the control unit 64 being configured to correct, if necessary, the trajectory of the printing module 68 as a function of the images input by the image sensor 78.

To this end, the surface S comprises register marks 80 to guide the inkjet printing device 50. A register mark 80 is understood to be equally an element applied to the surface S, like a mark, and a noteworthy element of the surface S.

According to a first configuration, the register marks 80 are noteworthy elements present on the surface S before the application of the coating Rev. When the surface S corresponds to the outer surface of an aircraft, the register marks 80 can correspond to rivet heads, to windows, to join lines between panels of the aircraft, to beads of mastic or any other distinctive element of the outer surface of the aircraft. According to this configuration, each register mark 80 has theoretical coordinates in the given reference frame R.

According to a second configuration, the register marks 80 are marks applied to the surface S by the printing device 50. These register marks 80, in the form of marks, can be applied by using an ink that is only visible in a limited portion of the electromagnetic spectrum (such as, for example, an ink that is fluorescent when it is exposed to an ultraviolet light but which is otherwise invisible), as described in the document U.S. Pat. No. 9,527,275.

Figure 7:
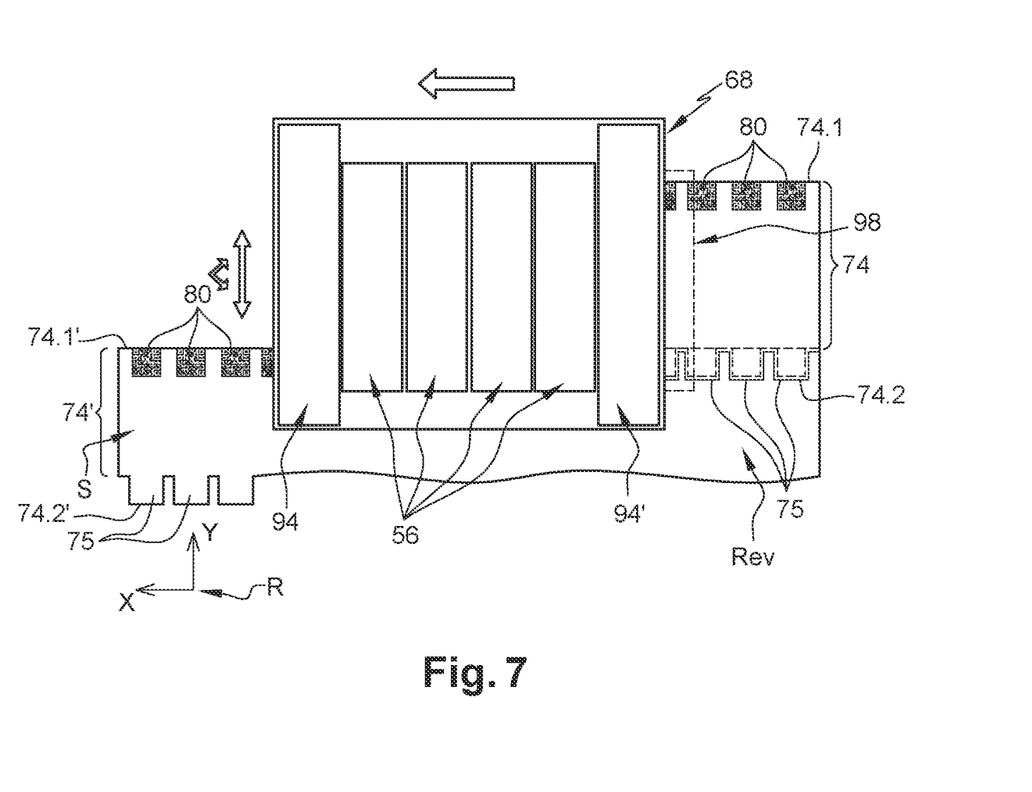
FIG. 7 is a top view of a printing module illustrating an embodiment of the invention in operation.

As illustrated in FIG. 7, these marks can be incorporated in the coating band 74' previously applied. They can advantageously be masked in the application of the next coating band 74. According to this embodiment, each coating band 74, 74' comprises a first edge 74.1, 74.1' and a second edge 74.2, 74.2' that are substantially parallel to one another. The register marks 80 are positioned along the first edge 74.1, 74.1'.

According to a first configuration, the second edges 74.2, 74.2' of each coating band 74, 74' comprise extensions 75, each configured to totally cover a register mark 80 of the adjacent coating band 74, 74' previously applied in order to mask it. This first configuration generates an overprint and an over-thickness in line with each register mark 80.

According to a second configuration, each register mark 80 comprises printed zones and non-printed zones. In this case, the second edges 74.2, 74.2' of each coating band 74, 74' comprise extensions 75 comprising printed zones in line with non-printed zones of the register mark 80 to be masked and non-printed zones in line with printed zones of the register mark 80 to be masked. This second configuration makes it possible to mask the register marks 80 without generating over-thicknesses.

The register marks 80 are configured to maximize their visibility by an image sensor while minimizing the perception of the presence of these register marks 80 once masked, and to do so despite any defects in the overprinting. Since the human eye more easily perceives structured and repetitive signals, the register marks 80 are advantageously composed of a pseudo-random pattern making it possible to render any possible defects in the overprinting less visible.

According to one embodiment, each register mark 80 comprises at least one code or one identifier which is specific to it. Thus, it is possible to differentiate the register marks 80 from one another. According to this second configuration, at least one printhead 56 of the printing module 68 is configured to print register marks 80 that are different from one another, which each comprise at least one code or one identifier making it possible to differentiate them.

The control unit 64 is configured to analyze each image taken by the image sensor 78 in order to detect each register mark 80 present in the image and transmit, if necessary, displacement setpoints 70 that are corrected in order to adapt the trajectory of the printing module 68 as a function of the register marks 80 detected in the images input by the image sensor 78.

According to one procedure, the control unit 64 is configured to determine, from the register marks 80 detected in the images input by the image sensor 78, a preceding trajectory followed by the printing module 68 in the application of the coating band previously deposited and determine a trajectory to be followed by the printing module 68 in order to deposit a new coating band as a function of the preceding trajectory.

Obviously, the invention is not limited to these procedures for the operation of the first servocontrol loop 76. The procedure described in the document U.S. Pat. No. 9,527,275 could be implemented.

According to one feature, the printing module 68 comprises at least first and second parts 82, 84, at least one articulation 86 linking the first and second parts 82, 84 and at least one actuator 88 configured to displace the second part 84 with respect to the first part 82, the first part 82 being secured to the articulated robot 62 and more particularly to its free end, each printhead 56 being secured to the second part 84.

Figure 6:
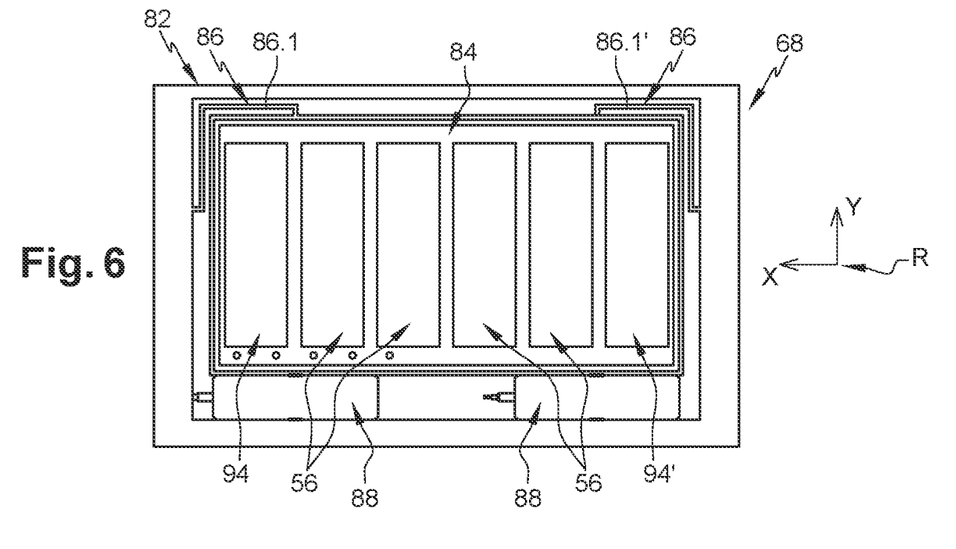
FIG. 6 is a front view of a printing module illustrating an embodiment of the invention.

According to a configuration that can be seen in FIG. 6, the second part 84 of the printing module 68 supports four printheads 56. Obviously, the invention is not limited to this number of printheads. Whatever the configuration, the second part 84 of the printing module 68 supports at least one printhead 56. If there are several printheads, they follow the same trajectory.

The articulation 86 is configured to allow the second part 84 to be displaced with respect to the first part 82 according to at least one movement out of a translational movement parallel to the transverse direction Y, a rotational movement about an axis of rotation parallel to the normal direction Z and a translational movement parallel to the normal direction Z. According to one configuration, the articulation 86 is configured to allow the second part 84 to be displaced with respect to the first part 82 according to a combination of movements out of a translational movement parallel to the transverse direction Y, a rotational movement about an axis of rotation parallel to the normal direction Z and/or a translational movement parallel to the normal direction Z.

According to a configuration that can be seen in FIGS. 6 and 7, the articulation 86 is configured to allow the second part 84 to be displaced with respect to the first part 82 according to movements out of a translational movement parallel to the transverse direction Y and a rotational movement about an axis of rotation parallel to the normal direction Z.

According to one embodiment, the articulation 86 comprises at least one elastically deformable element 86.1 linking the first and second parts 82, 84 of the printing module 68, configured to be deformed at least in a plane at right angles to the normal direction Z.

According to one configuration, the second part 84 has a rectangular perimeter and the first part 82 takes the form of a frame, that is rectangular, surrounding the second part 84. The frame formed by the first part 82 comprises longitudinal sides parallel to the direction of displacement X and transverse sides parallel to the transverse direction Y. According to this configuration, the articulation 86 comprises two elastically deformable elements 86.1, 86.1', positioned between the first and second parts 82, 84, at the ends of a longitudinal side of the frame formed by the first part 82.

Whatever the embodiment, the articulation 86 and notably the elastically deformable elements 86.1, 86.1' are configured to allow the second part 84 to be displaced with respect to the first part 82 according to movements comprising at least one translational movement parallel to the transverse direction Y with an amplitude of at least +/−0.5 mm and at least one rotational movement about an axis of rotation parallel to the normal direction Z with an amplitude of at least +/−0.5°.

Figure 5:
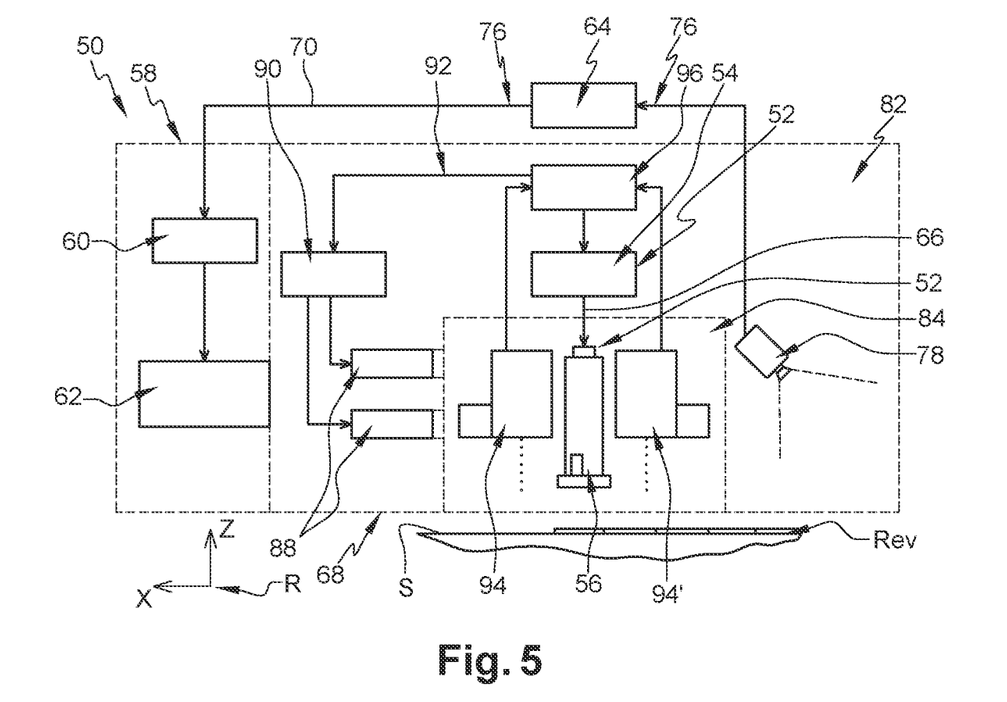
FIG. 5 is a schematic representation of a printing device illustrating a second embodiment of the invention.

According to a configuration that can be seen in FIG. 5, each actuator 88 is chosen from among a piezoelectric actuator and a moving coil electromagnetic actuator. Obviously, the invention is not limited to these actuators 88. Thus, the moving coil electromagnetic actuators could be replaced by fixed coil electromagnetic actuators. Whatever the embodiment, each actuator 88 of the printing module 68 is of the type with low amplitude, preferably less than 5 mm, but highly responsive. Each of them is configured to allow a displacement of the second part 84 with respect to the first part 82 with a position-changing frequency between 10 and 50 Hz, preferably with a high position-changing frequency greater than 10 Hz, of the order of 30 to 50 Hz, over a short travel.

According to one configuration, the printing module 68 comprises two actuators 88, 88', linking the first and second parts 82, 84 and positioned between them, offset with respect to one another in the direction of displacement X. According to an arrangement that can be seen in FIG. 6, the actuators 88, 88' are positioned on a first longitudinal side of the frame formed by the first part 82 and the elastically deformable elements 86.1, 86.1' are positioned on a second longitudinal side opposite the first longitudinal side.

Each of the two actuators 88, 88' is deformed in the transverse direction and is configured to displace the second part 84 with respect to the first part 82 in the transverse direction Y over a travel of the order of a few millimeters, more specifically over a travel of +/−0.5 mm with respect to a median position.

According to this configuration, when the two actuators 88, 88' are deformed in the same way in the same direction, the second part 84 is translated parallel to the transverse direction Y with respect to the first part 82. When the two actuators 88, 88' are deformed in opposite directions, the second part 84 pivots about an axis of rotation parallel to the normal direction Z with respect to the first part 82.

Figure 4:
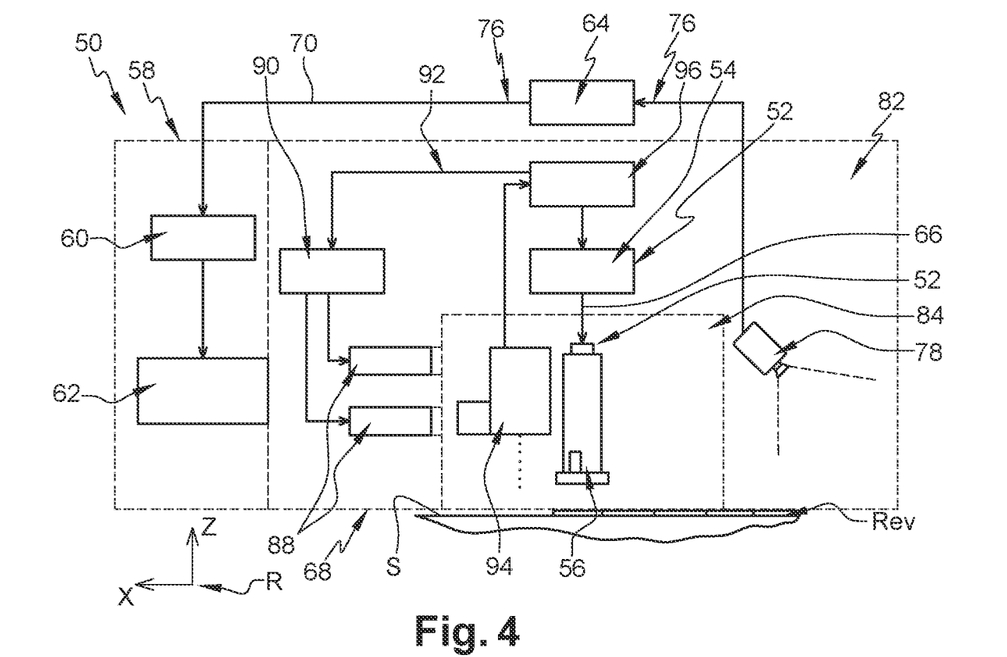
FIG. 4 is a schematic representation of a printing device illustrating a first embodiment of the invention.

Obviously, the invention is not limited to this embodiment comprising two actuators 88, 88'. Thus, as illustrated in FIG. 4, the printing module 68 can comprise only a single actuator 88.

The printing module 68 comprises a controller 90 for driving in real-time
the at least one actuator 88, 88' of the printing module 68.

According to another feature, the printing module 68 comprises a second servocontrol loop 92 making it possible to drive in real-time the movements of the second part 84 with respect to the first part 82.

This second servocontrol loop 92 comprises at least one sensor 94 configured to capture data relating to the surface S to which the coating Rev is applied and a processing unit 96 configured to compare, based on the data transmitted by the at least one sensor 94, the real position at a given instant of the second part 84 of the printing module 68 and a position desired at this given instant in order to determine whether there is a deviation and, if there is a deviation greater than a given threshold, drive the at least one actuator 88, 88' in order to modify the trajectory of the second part 84 or its position with respect to the first part 82 and, ultimately, the position of the at least one printhead 56 with respect to the surface S.

The processing unit 96 of the second servocontrol loop 92 is configured to determine, if a deviation greater than a given threshold is observed, at least one correction out of a translational movement parallel to the transverse direction Y and a rotational movement about an axis of rotation parallel to the normal direction Z.

In addition, if the processing unit 96 determines a deviation in the sense of the direction of displacement and this deviation is greater than a given threshold, the processing unit 96 is configured to speed up or slow down the frequency of ejection of the droplets from the printheads 56 in order to make up the determined deviation.

According to an arrangement that can be seen in FIG. 5, the second servocontrol loop 92 comprises a first sensor 94 positioned in front of the at least one printhead 56 and a second sensor 94' positioned behind the at least one printhead, the terms in front of and behind referring to the direction of displacement of the printing module 68.

According to one embodiment, the first and second sensors 94, 94' are secured to at least one part out of the first and second parts 82, 84 of the printing module 68.

According to one configuration, each sensor 94, 94' is a "contact" image sensor positioned so as to view the surface S. As a variant, each sensor 94, 94' is a line scan image sensor (line scan camera) with a telecentric lens/optic positioned so as to view the surface or a wide-field image sensor such as a matrix array camera, for example.

Obviously, the invention is not limited to this type of sensor or to this number of sensors 94, 94'. As illustrated in FIG. 4, the printing module 68 can comprise a single sensor 94. In addition, at least one displacement sensor of LVDT or capacitive type can be provided at each actuator 88, 88' to determine the real displacement provoked by the actuator 88, 88'.

According to one arrangement, the first and second sensors 94, 94' are offset with respect to one another in the transverse direction Y. When there are register marks 80 on each coating band 74, the first sensor 94 positioned in front is configured to view the register marks 80 positioned on the coating band 74' previously applied and the second sensor 94' positioned behind is configured to view the quality of the coating band 74 just applied and, in particular, the quality of the overprint which has just been applied by the printing module 68 to the coating band 74' previously applied. The quality of the overprint is notably assessed at the register marks 80 positioned on the coating bands 74.

According to one mode of operation, the second sensor 94' positioned behind the at least one printhead 56 is used to observe the entirety of the width of the coating band 74 that has just been applied by the printing module 68 in order to check in real-time any potential printing defects (dots missing because of a plugged nozzle, a non-conformal dot size, a color inaccuracy, etc.). Thus, this mode of operation makes it possible to detect a possible defect before a step of curing, hardening, drying or polymerizing of the coating band 74. These printing defects detected by virtue of the images from the second sensor 94' of the second servocontrol loop 92 are at least partially corrected in real-time by modifying the printing parameters of the inkjet printhead 56.

According to an embodiment that can be seen in FIG. 7, the printing module 68 comprises, behind the last inkjet printhead 56, at least one system 98 for polymerizing the coating band 74 just applied. According to this embodiment, the second sensor 94' is positioned between the last printhead 56 and the polymerizing system 98.

According to one arrangement, the first and second sensors 94, 94' are separated by a distance in the direction of displacement X that makes it possible to optimize the detection of potential orientation errors about the normal direction Z of the second part 84 of the printing module 68 with respect to the surface S so as to compensate this error. According to one procedure, the compensation of the orientation error about the normal direction Z is performed by driving at least one actuator 88, 88' between the first part 82 and the second part 84 of the printing module 68 and/or by transmitting at least one displacement setpoint 70 to the displacement system 58 of the articulated robot 62.

According to one embodiment, the second servocontrol loop 92 comprises at least one distance sensor measuring a distance between the second part 84 of the printing module 68 and the surface S in order to drive the at least one actuator between the first part 82 and the second part 84 of the printing module 68 so as to keep this distance close to a predefined distance.

According to one configuration, the at least one distance sensor is chosen from among an ultrasound distance measurement sensor or an optical distance measurement sensor (operating for example according to the principle of laser triangulation or of time-of-flight measurement).

The processing unit 96 comprises an algorithm configured to detect, from the data transmitted by the at least one sensor 94, a deviation in at least the transverse direction Y between the position or trajectory of the second part 84 of the printing module 68 supporting at least one printhead 56 and a desired position or trajectory.

According to one embodiment, the processing unit 96 is configured to detect a deviation in at least three directions: the direction of displacement X, the transverse direction Y and the normal direction Z.

According to one configuration, the processing unit 96 is an embedded computation platform composed of a high-performance processor accelerated by a GPU (graphics processing unit). This type of processing unit 96 makes it possible to obtain fast processing of complex images.

According to one configuration, the processing unit 96 is a field programmable gate array. This type of processing unit 96 makes it possible to obtain fast processing and with very low latency.

When the first sensor 94 positioned in front is configured to view the register marks 80 positioned on the coating band 74' previously applied and the second sensor 94' positioned behind is configured to view the register marks 80 positioned on the coating band 74 currently being applied by the printing module 68, the processing unit 96 is configured to determine, if a deviation greater than a given threshold is observed, at least one correction out of a translational movement parallel to the transverse direction Y and a rotational movement about an axis of rotation parallel to the normal direction Z.

The processing unit 96 is configured to transmit displacement setpoints to the controller 90 in order to modify, if necessary, the position of the second part 84 with respect to the first part 82 and instructions to the print control 54 to trigger, for each printhead, the deposition of each coating dot deposited on the surface S as a function of the position of the printhead 56.

According to one configuration, the processing unit 96 and the control unit 64 form one and the same element.

Figure 8:
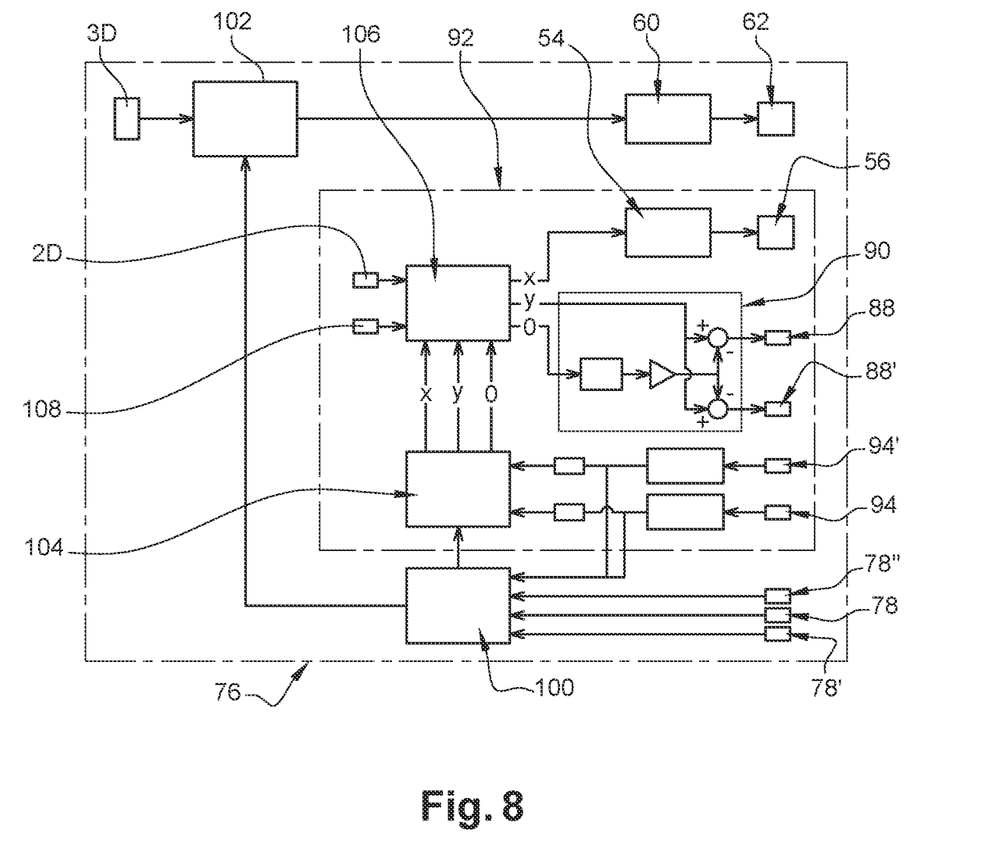
FIG. 8 is a schematic representation of first and second servocontrol loops illustrating an embodiment of the invention.

According to a mode of operation that can be seen in FIG. 8, the first servocontrol loop 76 comprises at least one sensor 78, 78', 78" (out of at least one camera 78, at least one line scanner 78' or the like 78"), a first position estimation system 100 configured to estimate at least one first estimated value of the real position of the articulated arm 62 from the information recorded by the sensor or sensors 78, 78', 78", at least one first regulator 102 configured to determine at least one first corrective value from the first value or values estimated by the first position estimation system 100 and a theoretical three-dimensional 3D trajectory that the printing module 68 must follow, as well as a displacement control 60 configured to drive the robotized arm 62 as a function of the first corrective value or values.

This first servocontrol loop 76 makes it possible to obtain a first correction of the position of the printing module 68 by controlling the robotized arm 62. The latter is configured to perform movements of large amplitude with a given position-changing frequency.

The second servocontrol loop 92 comprises at least one sensor 94, 94' (out of the first and second contact image sensors and/or first and second line scan image sensors or the like), a second position estimation system 104 configured to estimate at least one second estimated value of the printing module 68 from the information recorded by the sensor or sensors 94, 94', at least one second regulator 106 configured to determine at least one second corrective value from the second value or values estimated by the second position estimation system 104 and the image to be printed 108 as well as a controller 90 configured to drive in real-time the at least one actuator 88, 88' of the printing module 68 as a function of the corrective value or values.

According to one configuration, the information recorded by the sensor or sensors 94, 94' of the second loop 92 is transmitted to the first position estimation system 100 of the first servocontrol loop 76 and used by the latter to correct the position of the articulated arm 62.

According to one configuration, the first value or values estimated by the first position estimation system 100 of the first loop 76 is or are transmitted to the second position estimation system 104 of the second servocontrol loop 92 and used by the latter to determine the second estimated value or values.

According to one procedure, the second position estimation system 104 determines a second estimated value in the direction of displacement X, a second estimated value in the transverse direction Y and a second estimated angular value about the normal direction Z. In addition, the second regulator 106 is configured to determine a second corrective value in the direction of displacement X transmitted to the print control 54, a second corrective value in the transverse direction Y and a second corrective angular value about the normal direction Z, these last two corrective values being transmitted to the controller 90 to drive the actuators 88, 88'.

According to one embodiment, the second regulator 106 is configured to determine at least one second corrective value from the second value or values estimated by the second position estimation system 104, from the image to be printed 108 and from a theoretical flat 2D trajectory which corresponds to the projection of the theoretical three-dimensional 3D trajectory on the surface S to be painted.

According to the embodiment that can be seen in FIG. 8, the second servocontrol loop 92 estimates the position of the printheads 56 by considering the rough position of the robotized arm 62 and the relative position of the print previously printed by using the sensors 94, 94' to align the new print with respect to the print previously printed. The second regulator 106 is configured to maintain the correct position of the printheads 56 by considering the position estimated by the second position estimation system 104 and by comparing the latter to the image to be printed. The second corrective value determined by the second position estimation system 104 is transmitted to the actuators 88, 88' to correct the position of the printheads by rotation and translation in the transverse direction Y. The position of the printheads in translation in the direction of displacement X is corrected by controlling the print frequency supplied to the print control 54 of the printhead 56 which will expand or contract the print as a function of the advance/delay of the printhead 56 with respect to the printed image.

Obviously, the invention is not limited to this embodiment for the printing device 50. Whatever the embodiment, the latter comprises:
- an articulated robot 62 having a movable free end and a given displacement precision and position-changing frequency,
- a printing module 68 comprising:
  - a first part 82 linked to the free end of the articulated robot 62 and occupying a given position at a given instant,
  - a second part 84, movable with respect to the first part 82, supporting at least one printhead 56 and occupying a given position at a given instant with respect to the first part 82,
  - at least one actuator 88, 88' for displacing the second part 84 with respect to the first part 82, each actuator 88, 88' having a position-changing frequency, preferably greater than 10 Hz, at least five times greater than the position-changing frequency of the robotized arm 62,
  - a first servocontrol loop 76 configured to control, with a first given correction frequency, the articulated robot 62 and correct in real-time, if necessary, the trajectory of the articulated robot 62 and/or the position of the printing module, more specifically of the first part 82 of the printing module 68,
  - a second servocontrol loop 92 configured to control the actuator 88, 88' and correct in real-time, if necessary, the position of the second part 84 of the printing module 68 with respect to the first part 82, the second servocontrol loop 92 having a second correction frequency at least five times greater, preferably at least ten times greater, than the first correction frequency.

The printing device can comprise other servocontrol loops on the articulated robot 62.

The second servocontrol loop 92 comprises a set of elements out of at least one sensor 94, 94', at least one processing unit 96, at least one controller 90, at least one actuator 88, 88' that are suitable for obtaining this correction frequency.

By using at least two servocontrol loops 76, 92 nested in one another, having different correction frequencies, it is possible to achieve a requisite precision for a decoration applied to an outer surface of an aircraft, the first servocontrol loop 76 having a given correction frequency, a wide amplitude and a low bandwidth, the second servocontrol loop 92 having a second correction frequency at least five times greater than the first correction frequency, a low amplitude and a wide bandwidth. Thus, it is possible to obtain the requisite print precision with a market-standard robotized arm and a first servocontrol loop of the robotized arm that is known.

The first servocontrol loop 76 uses the images from at least one image sensor 94, notably a wide-field image sensor (for example, a matrix array camera observing the surface scrolling in front of the printing module 68) to calculate at least one deviation between the trajectory necessary to the production of a quality print and the trajectory actually performed by the articulated robot 62 in order to send at least one displacement setpoint 70 to the displacement control 60 of the articulated robot 62 aiming to reduce this deviation.

By virtue of this first servocontrol loop, the positioning errors are reduced, going from several millimeters to several tenths of millimeters.

The first servocontrol loop 76 is configured to detect and recognize the register marks 80 in the images from the image sensor in order to estimate the real position of the printing module 68 with respect to the surface S.

According to another feature, the second servocontrol loop 92 is configured to correct a positioning of the second part 84 with respect to the first part 82 with a correction frequency greater than 10 Hz, on the order of 30 to 50 Hz. The second servocontrol loop 92 uses at least one image sensor 94 that is highly responsive and at least one actuator 88, 88' with low amplitude but with great responsiveness in order to very responsively correct, with a latency less than 100 ms, the positioning of the second part 84 with respect to the first part 82 of the printing module 68 and thus compensate any possible residual errors left by the first servocontrol loop 76.

The second servocontrol loop 92 is configured to detect and recognize the register marks 80 in the images from at least one image sensor 94, 94' to:
- estimate the real position of the second part 84 of the printing module 68 with respect to the surface S,
- determine a positioning error in the transverse direction Y and the normal direction Z, and
- drive the at least one actuator 88, 88' between the first part 82 and the second part 84 of the printing module 68 in order to reduce this error.

The provision of at least two servocontrol loops and, more particularly, a second servocontrol loop 92 between two parts 82, 84 of the printing module supporting the at least one printhead makes it possible to obtain a printing device suited to complex surfaces of large dimensions, that offers a high print quality, that is highly responsive and that is capable of adapting to any oscillating movements, of the order of a hertz, of the articulated robot 62 or of the surface S to which the coating Rev is applied.

The systems and devices described herein may include a controller, such as controller 90, print control 54, displacement control 60, control unit 64, control unit 24, control device, controlling means, system control, processor, processing unit 96, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including
program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An inkjet printing device configured to apply a coating to a surface by being displaced parallel to a direction of displacement, the surface comprising a normal direction substantially at right angles to the surface at a given point of said surface, the inkjet printing device comprising:
an articulated robot which has a free end,
a printing module which comprises:
a first part linked to the free end of the articulated robot,
a second part, movable with respect to the first part, supporting at least one inkjet printhead and occupying a given position at a given instant with respect to the first part,
at least one actuator configured to displace the second part with respect to the first part,
a first servocontrol loop configured to control the articulated robot and correct, if necessary, with a given first correction frequency, a position of the printing module,
a second servocontrol loop configured to control the actuator and correct, if necessary, the position of the second part of the printing module with respect to the first part;
wherein the second servocontrol loop has a second correction frequency at least five times greater than the first correction frequency.

2. The inkjet printing device as claimed in claim 1, wherein the articulated robot has a given position-changing frequency, and
wherein each actuator configured to displace the second part with respect to the first part has a position-changing frequency greater than 10 Hz and at least five times greater than the position-changing frequency of the articulated robot.

3. The inkjet printing device as claimed in claim 1, wherein the printing module comprises at least one articulation, linking the first and second parts of the printing module, configured to allow the second part to be displaced with respect to the first part according to at least one movement out of a translational movement parallel to a transverse direction at right angles to the direction of displacement and to the normal direction, a rotational movement about an axis of rotation parallel to the normal direction and a translational movement parallel to the normal direction and wherein the printing module comprises two actuators linking the first and second parts and offset with respect to one another in the direction of displacement, each of the two actuators being deformed in the transverse direction and being configured to displace the second part with respect to the first part in the transverse direction.

4. The inkjet printing device as claimed in claim 2, wherein each actuator is chosen from among a piezoelectric actuator and an electromagnetic actuator.

5. The inkjet printing device as claimed in claim 1, wherein the second servocontrol loop comprises at least one sensor configured to capture data relating to the surface to which the coating is applied and a processing unit configured to compare, from the data transmitted by said at least one sensor, a real position at a given instant of the second part of the printing module and a position desired at this given instant, in order to determine if there is a deviation and, if there is a deviation greater than a given threshold, drive said at least one actuator between the first part and the second part in order to modify the position of the second part with respect to the first part.

6. The inkjet printing device as claimed in claim 5, wherein the second servocontrol loop comprises a first sensor positioned in front of said at least one printhead and a second sensor positioned behind said at least one printhead.

7. The inkjet printing device as claimed in claim 6, wherein the first and second sensors are offset with respect to one another in a transverse direction at right angles to the direction of displacement and to the normal direction.

8. The inkjet printing device as claimed in claim 7, wherein the processing unit is configured to determine, if a deviation greater than a given threshold is observed, at least one correction out of a translational movement parallel to the transverse direction and a rotational movement about an axis of rotation parallel to the normal direction.

9. The inkjet printing device as claimed in claim 5, wherein each sensor is a "contact" image sensor positioned so as to view the surface.

10. The inkjet printing device as claimed in claim 1, wherein the second servocontrol loop is configured to correct a positioning of the second part with respect to the first part with a latency less than 100 ms.

11. The inkjet printing device as claimed in claim 1, wherein the second servocontrol loop comprises at least one distance sensor measuring a distance between the second part of the printing module and the surface in order to drive said at least one actuator between the first part and the second part of the printing module so as to keep this distance close to a predefined distance.

12. A method for producing a coating on a surface comprising:
    applying, in turns, several coating bands that are parallel to one another and juxtaposed to one another by using an inkjet printing device as claimed in claim 1, each coating band comprising:
        a first edge and a second edge that are substantially parallel to one another, and
        register marks for guiding the inkjet printing device which are positioned along the first edge,
        the second edges of each coating band comprising extensions configured to mask the register marks of the adjacent coating band previously applied.

13. The method for producing a coating as claimed in claim 12,
    wherein each register mark comprises printed zones and non-printed zones, and
    wherein each extension comprises printed zones in line with non-printed zones of the register mark to be masked and non-printed zones in line with printed zones of the register mark to be masked.

14. The method for producing a coating as claimed in claim 13, wherein each extension is configured to totally cover a register mark.

* * * * *